United States Patent [19]
Anderson et al.

[11] Patent Number: 5,954,424
[45] Date of Patent: Sep. 21, 1999

[54] ILLUMINATION SYSTEM FOR HARD COPY APPARATUS

[75] Inventors: Charles H. Anderson, Dallas; John B. Allen, Lucas; George Nado, Plano; Mike Harte, Garland; Oscar Banos, Richardson, all of Tex.

[73] Assignee: Texas Instruments Incorporated, Dallas, Tex.

[21] Appl. No.: 08/735,616

[22] Filed: Oct. 23, 1996

[51] Int. Cl.$^6$ .................................................. F21V 13/00
[52] U.S. Cl. .......................... 362/242; 362/246; 362/268
[58] Field of Search .................................. 362/235, 236, 362/242, 246, 268, 33

[56] References Cited

U.S. PATENT DOCUMENTS

| | | | |
|---|---|---|---|
| 4,787,013 | 11/1988 | Sugino et al. | 362/32 |
| 4,893,223 | 1/1990 | Arnold | 362/252 |
| 5,041,851 | 8/1991 | Nelson | 346/160 |
| 5,105,207 | 4/1992 | Nelson | 346/160 |
| 5,151,718 | 9/1992 | Nelson | 346/160 |
| 5,159,485 | 10/1992 | Nelson | 359/291 |
| 5,467,146 | 11/1995 | Huang et al. | 348/743 |
| 5,631,721 | 5/1997 | Stanton et al. | 355/71 |
| 5,704,700 | 1/1998 | Kappel et al. | 353/31 |

*Primary Examiner*—Sandra O'Shea
*Assistant Examiner*—Michael J. Smith
*Attorney, Agent, or Firm*—Charles A. Brill; Frederick J. Telecky, Jr.; Richard L. Donaldson

[57] ABSTRACT

An illumination system (10,30,100,130,150,180,200) for hard copy applications including an elongated array (32) of light emitting elements (34) in combination with a light mixing element (42,46) for mixing the light from the individual elements in the lateral or cross-process direction. A curved array (32) or linear array (102) of light emitting elements with an aspheric lens (108) may be utilized, with a cylindrical lens (36,106) compressing the beam of light in the vertical or process direction. The light mixing elements (42,46) are preferably comprised of holographic diffusers. Sufficient mixing of the light from the array is achieved in the cross-process direction whereby a reduction in light output of one light emitting element does not generate a significant localized reduction in intensity at the elongated spatial light modulator. Preferably, the spatial light modulator is a digital micromirror device (DMD), but may also comprise of other devices including those of the transmissive type, including liquid crystal devices.

21 Claims, 10 Drawing Sheets

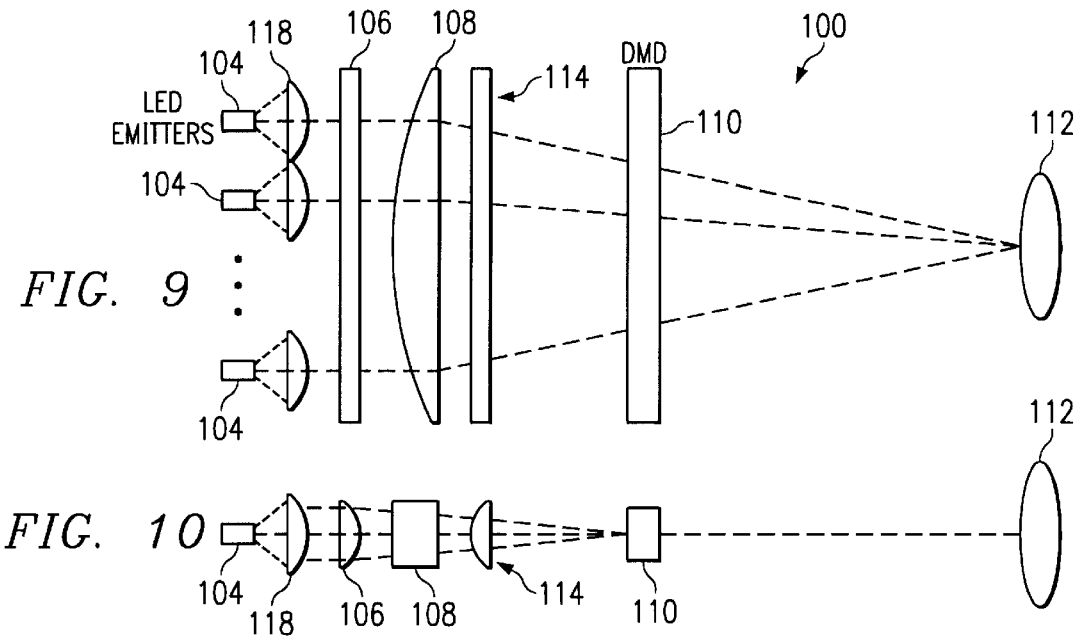
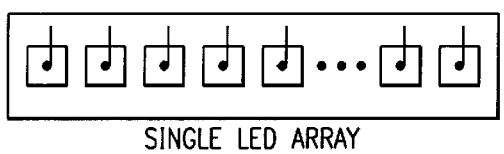
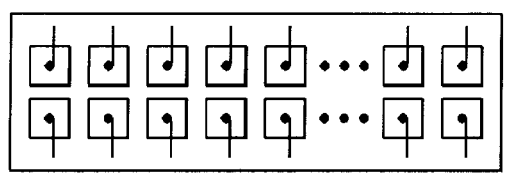
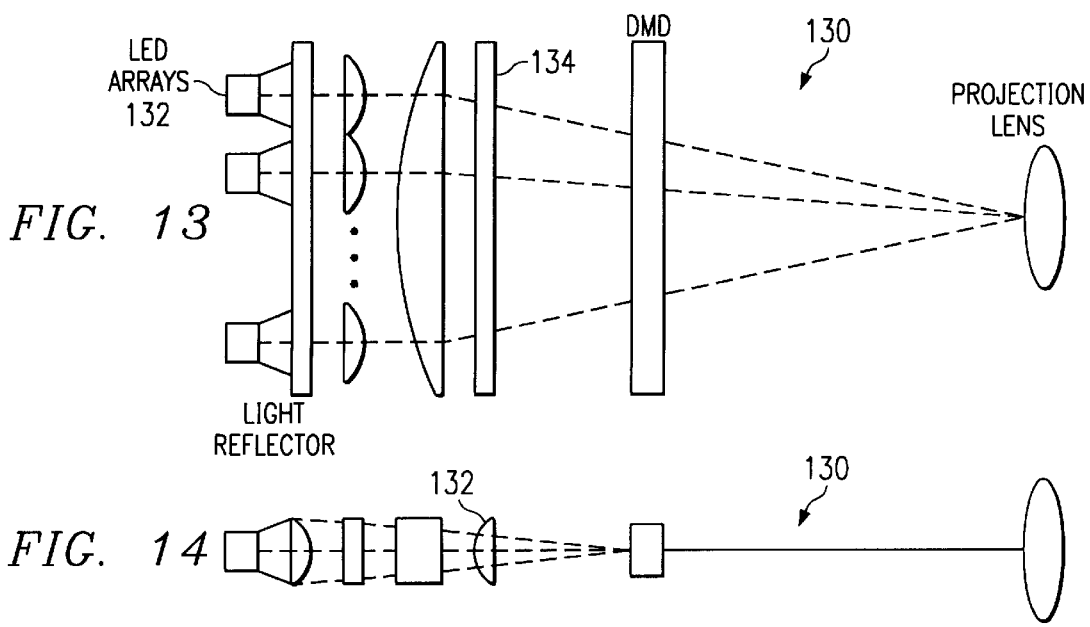

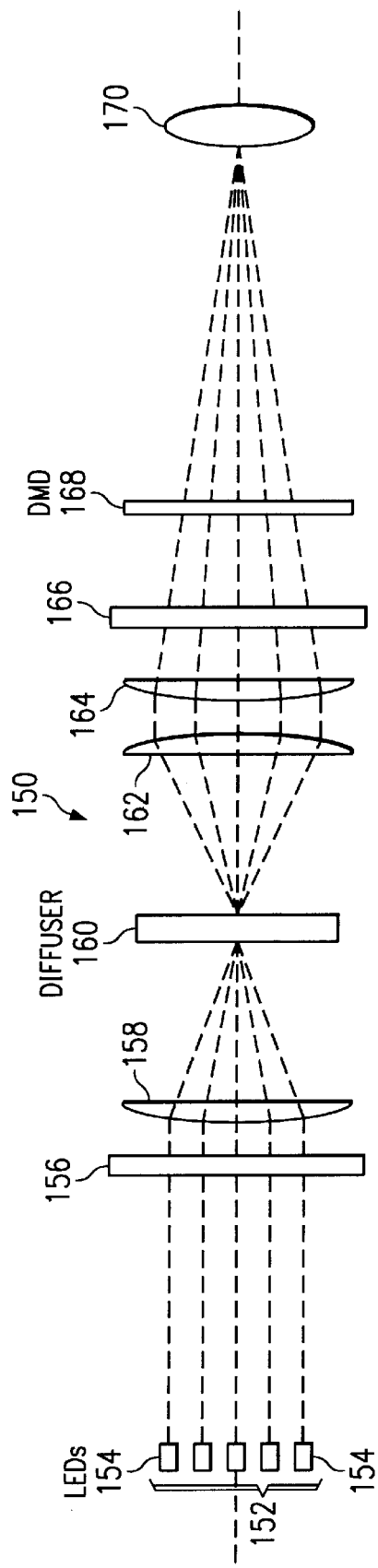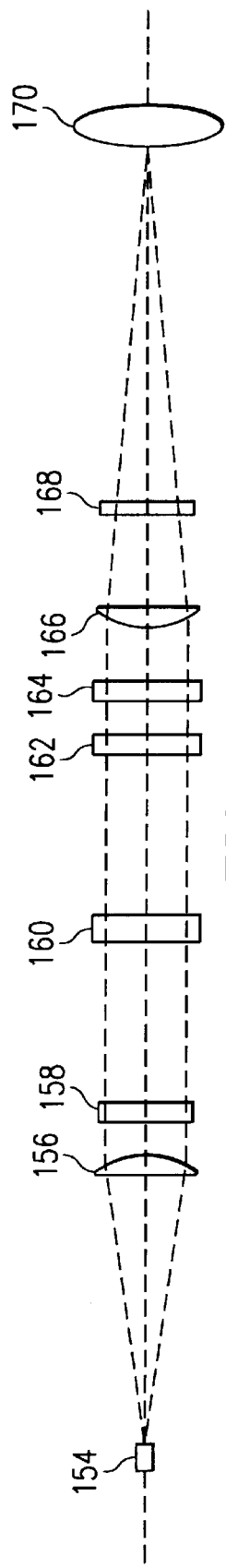

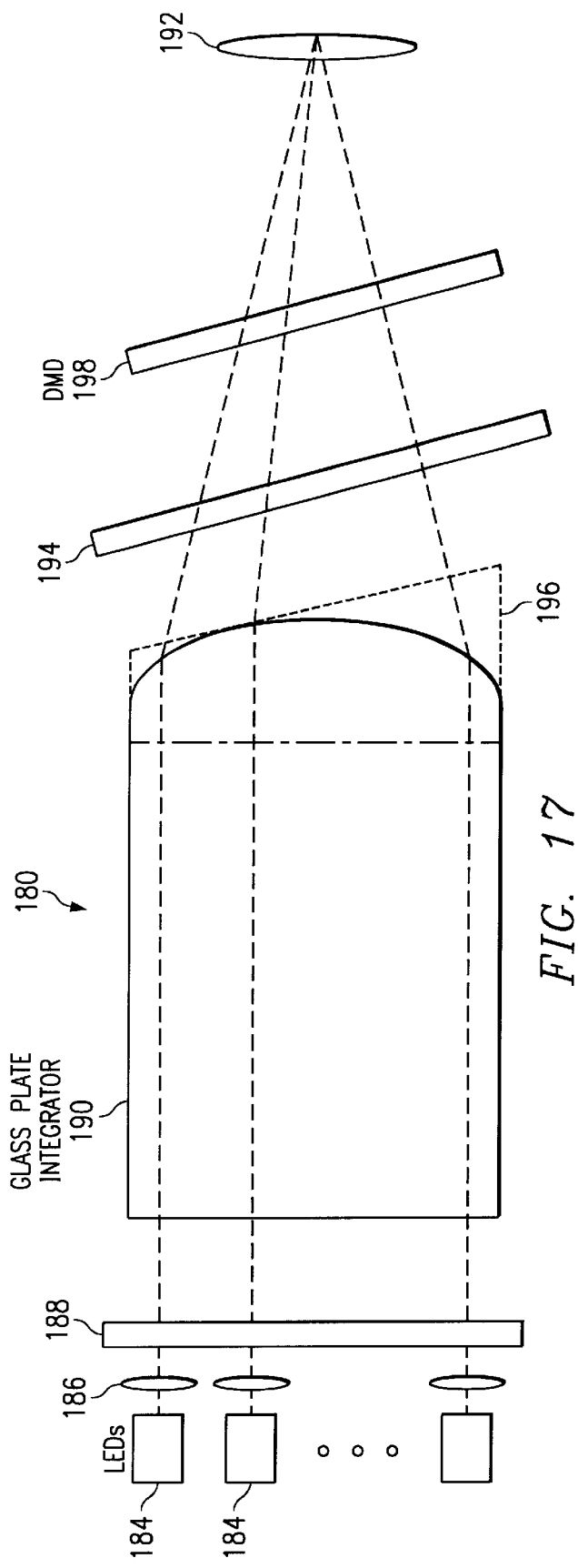
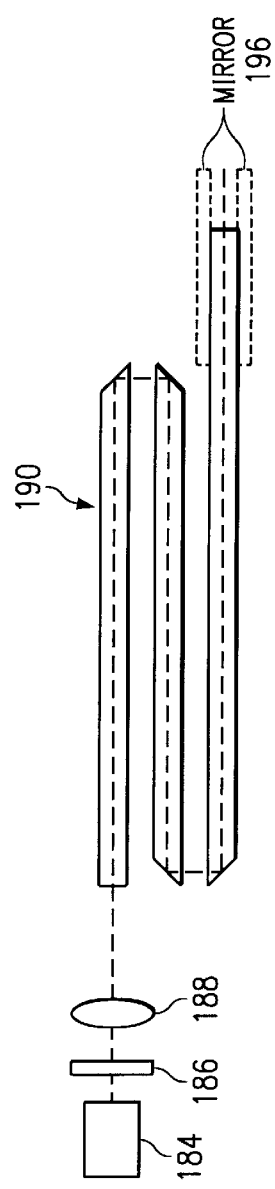
FIG. 17
FIG. 18

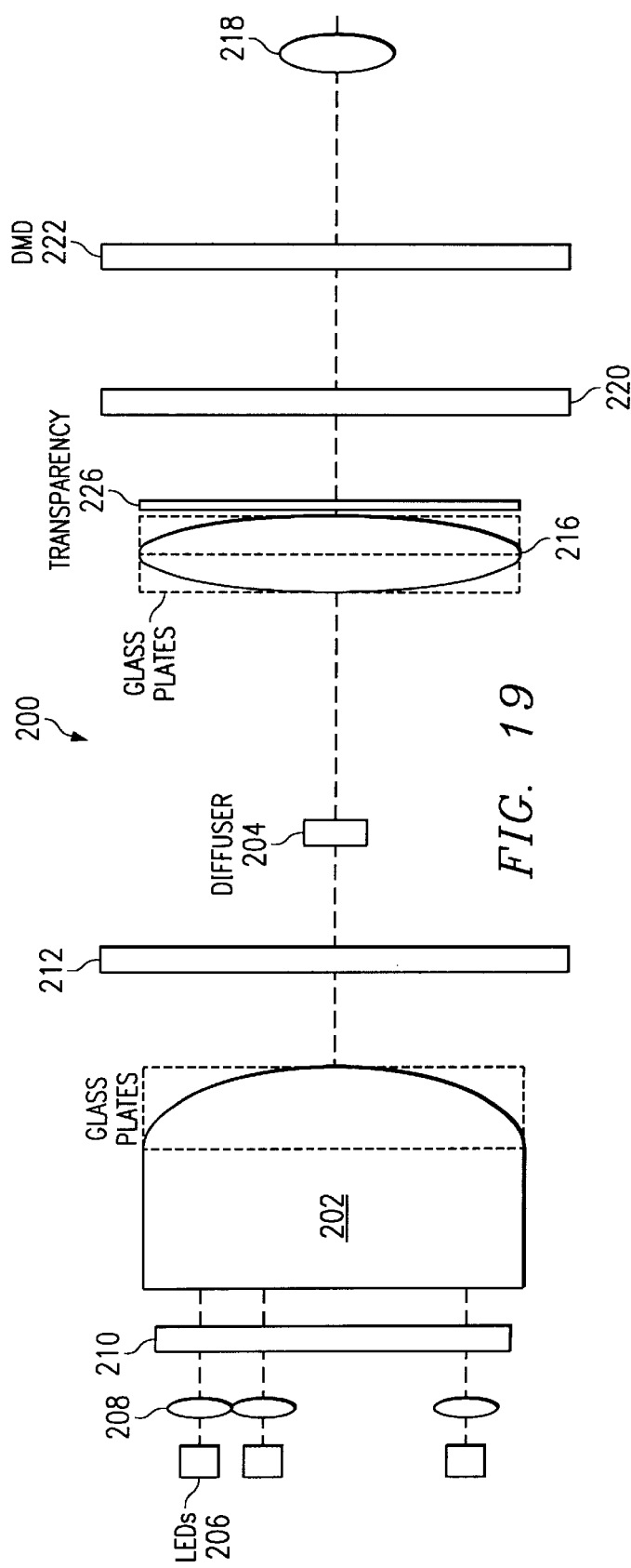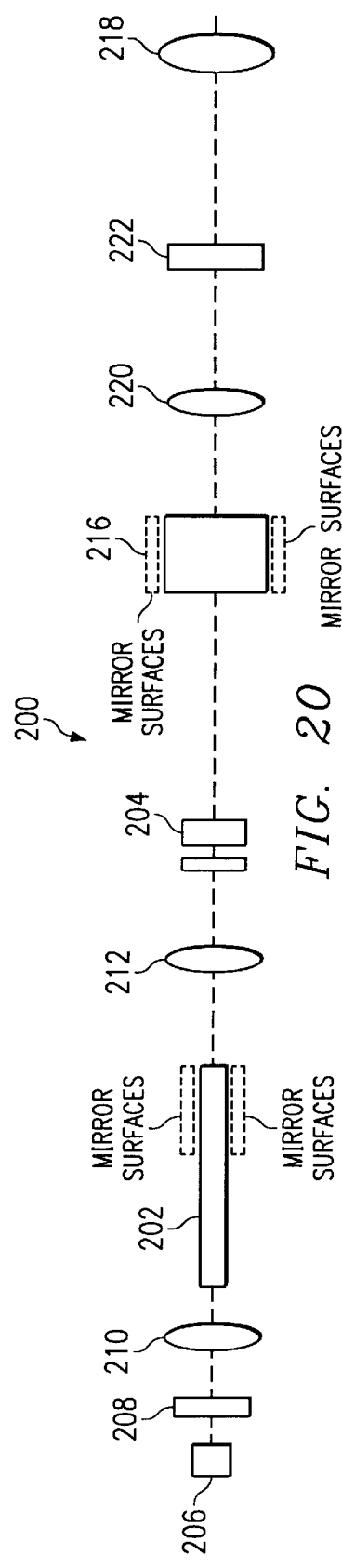

ILLUMINATION SYSTEM FOR HARD COPY APPARATUS

CROSS REFERENCE TO RELATED APPLICATIONS

Cross reference is made to the following commonly assigned co-pending patent applications, the teachings of which are incorporated herein by reference:

| SERIAL # | NAME | FILED |
|---|---|---|
| 08/371,348 | DMD Modulated Continuous Wave Light source for Xerographic Printer | 01-11-95 |
| 08/221,739 | Illumination Control Unit for Display System with Spatial Light Modulator | 3-31-94 |
| 07/809,996 | System and Method for Achieving Gray Scale Spatial Light Modulator Operation | 12-18-91 |
| TI-20502 (Attn'y Docket) | Multiple Emitter Illuminator Engine | Herewith |

TECHNICAL FIELD OF THE INVENTION

This invention relates generally to an image display system such as a xerographic printer, and more particularly, to an illumination system providing a light beam having a uniform distribution of high-intensity light to a spatial light modulator.

BACKGROUND OF THE INVENTION

Semiconductor spatial light modulators (SLM's) are one viable solution to realizing high quality, affordable xerographic printers. One promising SLM technology suitable for both printers and displays is the deformable mirror device or digital micromirror device (collectively DMD) manufactured by Texas Instruments Incorporated of Dallas Tex. The DMD is a monolithic semiconductor device having a linear or area array of bi-stable movable micromirrors fabricated over an array of corresponding addressing memory cells. One embodiment of a xerographic printer implementing a tungsten light source focused via optics on an imaging DMD mirror array is disclosed in U.S. Pat. No. 5,041,851 to Nelson, entitled "Spatial Light Modulator Printer and Method of Operation", assigned to the same assignee as the present application and the teachings included herein by reference.

In a xerographic printer implementing an imaging DMD spatial light modulator, it is desired to uniformly illuminate the elongated DMD mirror array (typically about 7 inches in length) with a homogeneous light source such that each pixel mirror of the array modulates a uniform intensity portion of light. This is necessary because the DMD mirror array modulates this light to expose a light sensitive rotating printing drum, whereby the intensity and duration of the modulated light directed thereon determines the relative exposure of the charged drum. The exposed portion of the drum comprises a latent image, wherein a quantity of toner will adhere to the drum image, this toner then being transferred to a printing medium such as paper, and fused thereon using heat.

It is also necessary that the energy of the light directed upon the DMD mirror array be of sufficient flux per unit area to fully expose the rotating printing drum to obtain a dark image. If insufficient light energy is modulated and directed to the drum by the DMD mirror array, the printing drum may not be fully exposed, thus degrading the contrast of the image printed on a printing medium.

U.S. Pat. No. 5,159,485 to Nelson, entitled "System and Method for Uniformity of Illumination for Tungsten Light", assigned to the same assignee of the present invention and the teachings included herein by reference, discloses an anamorphic optical path arranged such that the vertical component of the source light is compressed to match the physical shape of the DMD mirror array. The embodiment disclosed dramatically increases the optical efficiency of the system, whereby light energy is compressed to irradiate the DMD mirror array more intensely from a given light source, such as a tungsten lamp.

U.S. Pat. No. 5,151,718 to Nelson, entitled "System and Method for Solid State Illumination for DMD Devices", also assigned to the same assignee of the present invention and the teachings included herein by reference, discloses an array of LED emitters constructed to efficiently replace the conventional tungsten source lamp. The LED array is geometrically configured, and can be electrically operated by strobing to vary the brightness of light to individual mirror pixels to achieve gray scale imaging, and reduce fuzzy line images. Each of the LED's in the array can be provided with a lens to help columnate the light through optics and onto the DMD mirror array. Using LED's, light is efficiently directed and focused onto the DMD mirror array, with little light being wasted and directed elsewhere. Less optical energy is required of the light source compared to a conventional tungsten lamp to illuminate the DMD mirror array with a particular light intensity. The LED's can be quickly turned on and off, thereby providing the ability to modulate the light energy directed upon the DMD mirror array, and consequently, helps achieve gray scale printing. For instance, during a given line print cycle, the LED can be on for 50% of the cycle time to irradiate the DMD array with half the light energy available for that particular time interval. The alignment of the optics ensures that the energy of each LED is directed upon the DMD mirror array. That is to say, the LED array may not produce sufficient and uniform light energy should one LED fail or have a reduced output.

U.S. Pat. No. 5,105,207 to Nelson, entitled "System and Method for Achieving Gray Scale DMD Operation", assigned to the same assignee as the present invention and the teachings incorporated herein by reference, discloses a system for enhancing resolution of a xerographic process by submodulation of each individual pixel. The submodulation is achieved by anamorphically reducing the square pixel presentation of light rays to a rectangle having a number of controllable segments within each square pixel scanned line. A conventional tungsten lamp is incorporated in this embodiment.

It is desirable to provide a low cost, high intensity optical system whereby the elongated DMD mirror array can be uniformly illuminated with high intensity light. Moreover, it is desirable to provide a high intensity light source which can be modulated in intensity to effect gray scale printing. The optical system should be easy to align, whereby any degradation in the light source would be uniformly presented to the DMD array, and would not noticeably degrade the printing quality of the xerographic printer.

SUMMARY OF THE INVENTION

The present invention achieves technical advantages as an illumination system having an elongated array of light emitting elements in combination with a spreading element which laterally mixes the light from the individual light elements for illuminating an elongated spatial light modulator. In the preferred embodiment, a holographic diffuser is implemented to laterally diffuse and mix the light, in combination with a cylindrical lens to vertically compress the light. A 10% reduction in light output from one of the light elements causes less than a 1% localized reduction in light intensity at the spatial light modulator. Thus, a highly uniform intensity light beam illuminates the elongated spatial light modulator even when the output of one element is reduced.

The present invention comprises an illumination system having an elongated array of light emitting elements, with a mixing device mixing the light from the individual light emitting elements in the lateral direction, commonly referred to as the "cross-process" direction in hard copy applications. The mixed light from the mixing device illuminates an elongated spatial light modulator, such as a digital micromirror device (DMD), but which could also comprise of other spatial light modulators including liquid crystal displays and so forth. The mixing of the light from the emitters causes each micromirror to be illuminated by a plurality of light sources so that if one source degrades over time, the loss in exposure produced by a given micromirror is small. The present invention also comprises a projection lens with the light modulated by the spatial light modulator being focused into the projection lens pupil. The projection lens focuses the modulated light image to an exposure module such as an Organic Photoconductor (OPC) drum.

In one preferred embodiment of the invention, the elongated array of light emitting elements is curved or arcuate. The light from the individual light emitting elements is directed to converge on the spatial light modulator. Preferably, a cylindrical lens is utilized to compress the elongated beam of light from the array in the vertical direction, also known as the "process" direction. At least one holographic diffuser is implemented, and preferably two holographic diffusers, with one elongated diffuser being placed in front of and closely proximate the array of light emitting elements. A second holographic diffuser is provided along the surface of the cylindrical lens, and preferably the rear surface thereof. Each of these holographic diffusers diffuse the light from the array of light emitting elements in the lateral or cross-process direction, to effectively mix or homogenize the light from the individual light emitting elements to achieve a uniform elongated beam of light being directed upon the elongated spatial light modulator.

In a second preferred embodiment of the present invention, a linear coplanar elongated array of light emitting elements is utilized in combination with an aspheric lens to converge the light from the array in the cross-process direction onto the elongated spatial light modulator. Utilization of the aspheric lens with the linear array is functionally equivalent to the curved array of light emitting elements of the first embodiment, to condense/converge the elongated light beam in the cross-process direction onto the spatial light modulator. At least one mixing device is utilized to mix the light from the array in the lateral direction, preferably a holographic diffuser, although other light mixing devices are available including a ground glass plate or a diffraction grating. Hence, limitation to utilizing a holographic diffuser is not to be inferred. One elongated diffuser is preferably placed in front of and closely proximate the array of light emitting elements. A second holographic diffuser can also be provided along the surface of the aspheric lens, and preferably the rear surface thereof. Preferably, a cylindrical lens is also utilized to compress the beam of light from the array of light emitting elements in the vertical or process direction and onto the spatial light modulator.

In yet alternative embodiments of the present invention, other combinations of cylindrical lenses, aspheric lenses, Fresnel lenses, and light mixing elements can be utilized to effectively mix the light from the elongated array of light emitting elements in the cross-process direction. Each of these embodiments provide an effectively mixed elongated light beam the spatial light modulator for imaging, whereby reduction in light output of any one light emitting element only generates a slightly reduced localized light intensity at the elongated spatial light modulator. Preferably, LEDs are used for the light emitting elements, but laser sources of flash lamps, for instance, could also be used. Through use of the present invention, the expected degradation (about 10%) in some of the light emitting elements after 1000 hours of operation can be tolerated without experiencing a significantly degraded light beam at the spatial light modulator.

BRIEF DESCRIPTION OF THE DRAWINGS

FIG. 9 is an optical schematic diagram of the embodiment shown in FIG. 8 taken from above, illustrating the aspheric lens converging the light from the elongated array of light emitting elements in the cross-process direction onto the spatial light modulator and focused into the projection lens;

FIG. 10 is an optical schematic diagram of the embodiment shown in FIG. 8 taken from the side, illustrating the cylindrical lens compressing the light in the vertical or process direction onto the spatial light modulator and focused into the projection lens;

FIG. 11 is an illustration of an linear array having a single row of light emitting elements which may be utilized in the present invention to provide a narrow elongated beam of light;

FIG. 12 is an alternative configuration of the array of light emitting elements comprised of multiple rows of light emitting elements to generate a brighter, although wider, elongated beam of light;

FIG. 13 is an optical schematic diagram of yet another alternative preferred embodiment of the present invention, similar to that shown in FIG. 9, whereby a cylindrical lens is utilized to vertically compress the light from the array of light emitting elements which may not have individual circular lenses that are typically integral to LEDs;

FIG. 14 is an optical schematic diagram of the embodiment shown in FIG. 13 taken from the side illustrating the cylindrical lens imaging the light from the array of light emitting elements onto the spatial light modulator;

FIG. 15 is an optical schematic diagram of yet another alternative preferred embodiment of the present invention, illustrating a first aspheric lens focusing the light from the array of light emitting elements onto a holographic diffuser, with a pair of aspheric lens thereafter directing the diffused light onto the spatial light modulator;

FIG. 16 is an optical schematic diagram of the embodiment shown in FIG. 15 illustrating the width of the light beam through the optics;

FIG. 17 is yet another alternative preferred embodiment of the present invention whereby a glass plate integrator is utilized in place of the holographic diffuser to thoroughly and effectively mix the light from the array of light emitting elements in the cross-process direction;

FIG. 18 is a side view of the embodiment of FIG. 17 illustrating the combination glass plate integrator having beveled edges to direct the light from one piece to the next to achieve a thorough mixing of the light;

FIG. 19 is yet another alternative preferred embodiment of the present invention utilizing a light integrator in combination with a holographic diffuser to achieve a thorough mixing of the light; and FIG. 20 is a side view of the embodiment of FIG. 19.

DETAIL DESCRIPTION OF THE PREFERRED EMBODIMENT

Figure 1:
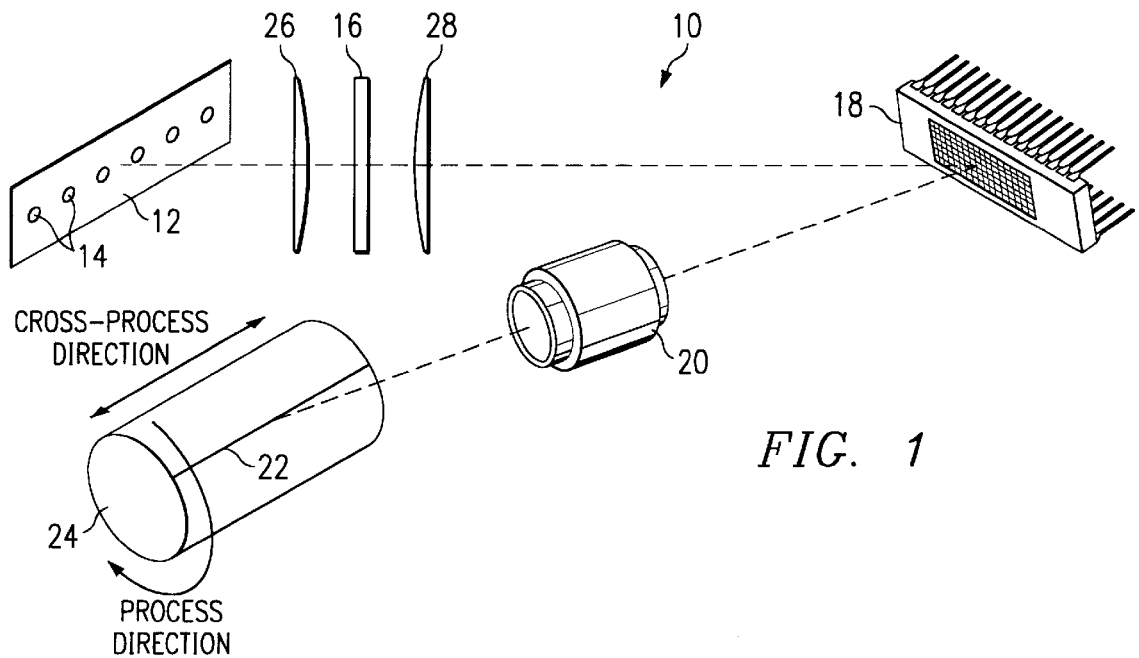
FIG. 1 is a perspective view of an illumination system according to the preferred embodiment of the present invention whereby an elongated array of light emitting elements generates an elongated light beam, in combination with a spreading element which thoroughly mixes the light from the individual light elements in the lateral or cross-process direction, this mixed light illuminating an elongated spatial light modulator.

Referring now to FIG. 1, there is generally shown at 10 an illumination system according to the preferred embodiment of the present invention. System 10 is seen to include an elongated array 12 of light emitting elements 14 with the light output from the individual elements 14 being thoroughly mixed in the lateral or cross-process direction by a light spreading element 16. The mixed light from spreading element 16 thereafter is directed upon an elongated spatial light modulator 18, which is preferably a digital micromirror device (DMD) such as that manufactured by Texas Instruments of Dallas Tex., but could also comprise of other spatial light modulators if desired including liquid crystal displays etc. Spatial light modulator 18 modulates the incident light and forms a light image which is directed into a projection lens 20. Projection lens 20 focuses the imaged light from the spatial light modulator 18 to an image plane 22 of an exposure module, such as an organic photoconductor (OPC) 24. A pair of lenses 26 and 28 may be utilized alone or in combination, to effectively compress and converge the elongated beam of light from elongated array 12 and image the light from the light emitting elements onto the spatial light modulator 18. In the preferred embodiment, light mixing device 16 is preferably a holographic diffuser, but could also comprise of other devices including a glass plate light integrator or a transmitting phase grating.

Figure 2:
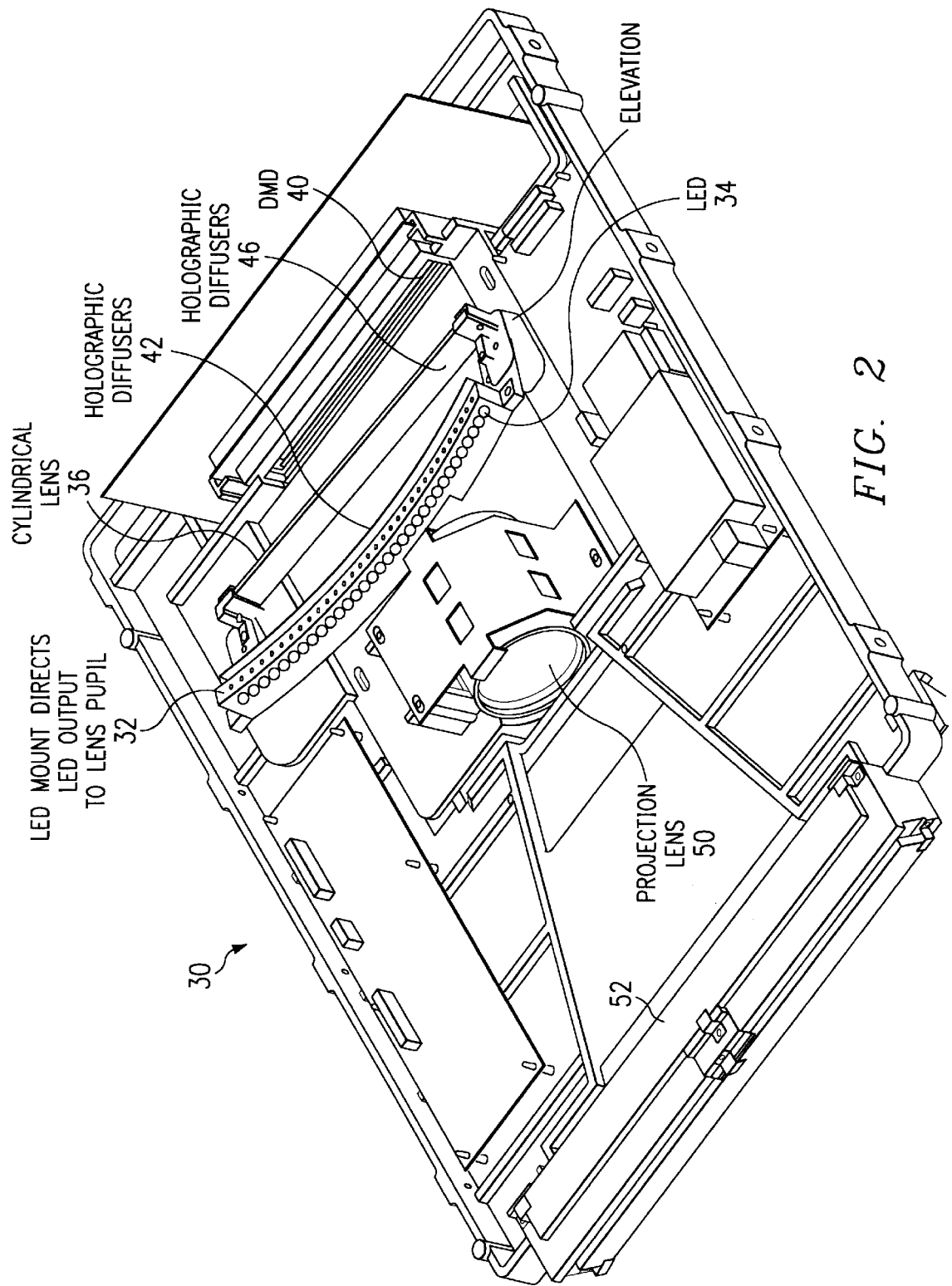
FIG. 2 is a perspective view of one preferred embodiment of the present invention whereby the elongated array of light emitting elements is curved or arcuate, with the light from each of light emitting elements being laterally diffused by a holographic diffuser and converging upon the spatial light modulator, whereby a cylindrical lens condenses the light in the vertical or process direction.

Turning now to FIG. 2, one preferred embodiment of the present invention is generally shown at 30. Illumination system 30 is seen to include a curved or arcuate array 32 of light emitting elements 34, each element 34 preferably being comprised of a 15 milliwatt light emitting diode (LED). The curved array 32 is concave, with the light emitting end of the LEDs 34 being directed toward the concave side of array 32, whereby the light from each LED 34 is directed through a cylindrical lens 36 and converged upon an elongated spatial light modulator 40. Spatial light modulator 40 is preferably comprised of a digital micromirror device (DMD). An elongated holographic diffuser 42 is positioned closely proximate and in front of the light emitting end of each LED 34 of array 32 as shown, and has a curvature such that it is parallel to array 32, as shown. Holographic diffuser 42 diffuses the light from each light emitting element 34 in the lateral or cross-process direction. A second diffuser 46 is securingly positioned in front of and on the flat surface of the cylindrical lens 36, as shown, but could also be placed in back of cylindrical lens 36 if desired. The additional holographic diffuser 46 further the wide beam of light incident to the cylindrical lens 36 in the cross-process direction, before the diffused light is directed upon and incident to the spatial light modulator 40. The diffused light is modulated and imaged by spatial light modulator 40 and directed into a projection lens 50, lens 50 focusing the light image from the spatial light modulator 40 to an image plane 52.

Figure 3:
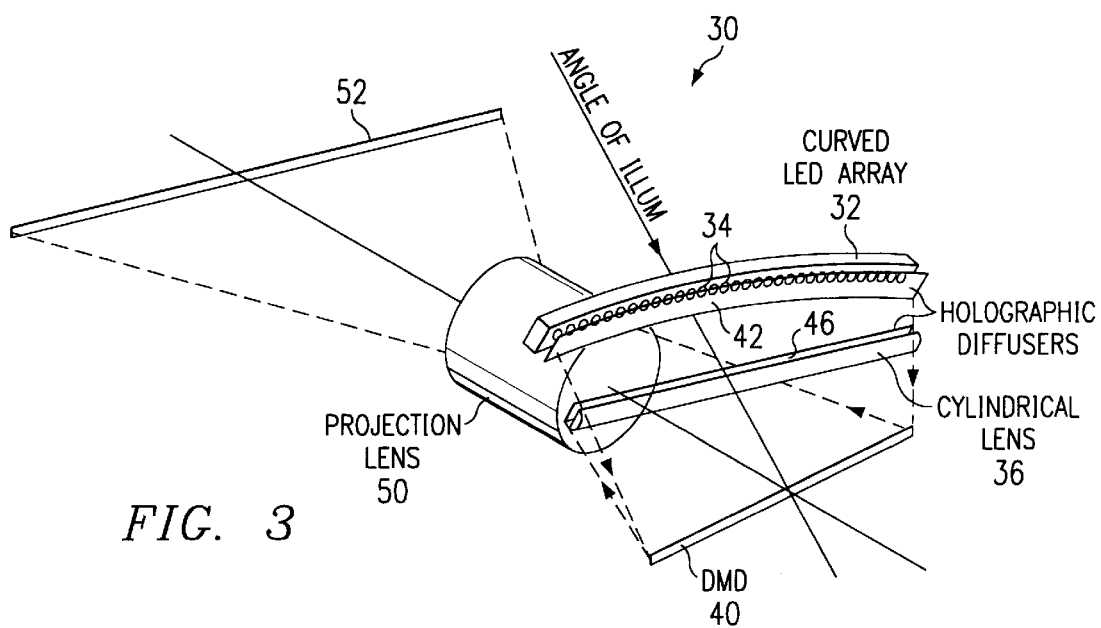
FIG. 3 is an optical schematic diagram of the embodiment shown in FIG. 2, illustrating the light from the curved array of light emitting elements being laterally diffused by an elongated holographic diffuser in the cross-process direction, compressed by a cylindrical lens in the process direction, modulated by a spatial light modulator, and focused by a projection lens to an image plane which may be the surface of an organic photoconductor (OPC) of a hardcopy printer.

Referring to FIG. 3, an optical schematic diagram of the embodiment of FIG. 2 is shown. As illustrated, the light output from each of the individual LEDs 34 of array 32 is directed through the first holographic diffuser 42 and the second holographic diffuser 46 into the cylindrical lens 36. Lens 36 lies in the same plane as the array 32, and vertically compressed the beam of light from the LED array 32 in the process direction. The compressed light is then directed upon and illuminates the DMD spatial light modulator 40, as illustrated. The elongated spatial light modulator 40 modulates the incident light, and directs the modulated light image into the projection lens 50 positioned below the array 32, as shown. Projection lens 50 focuses the light image from the spatial light modulator 40 onto the image plane 52, as shown.

Figure 4:
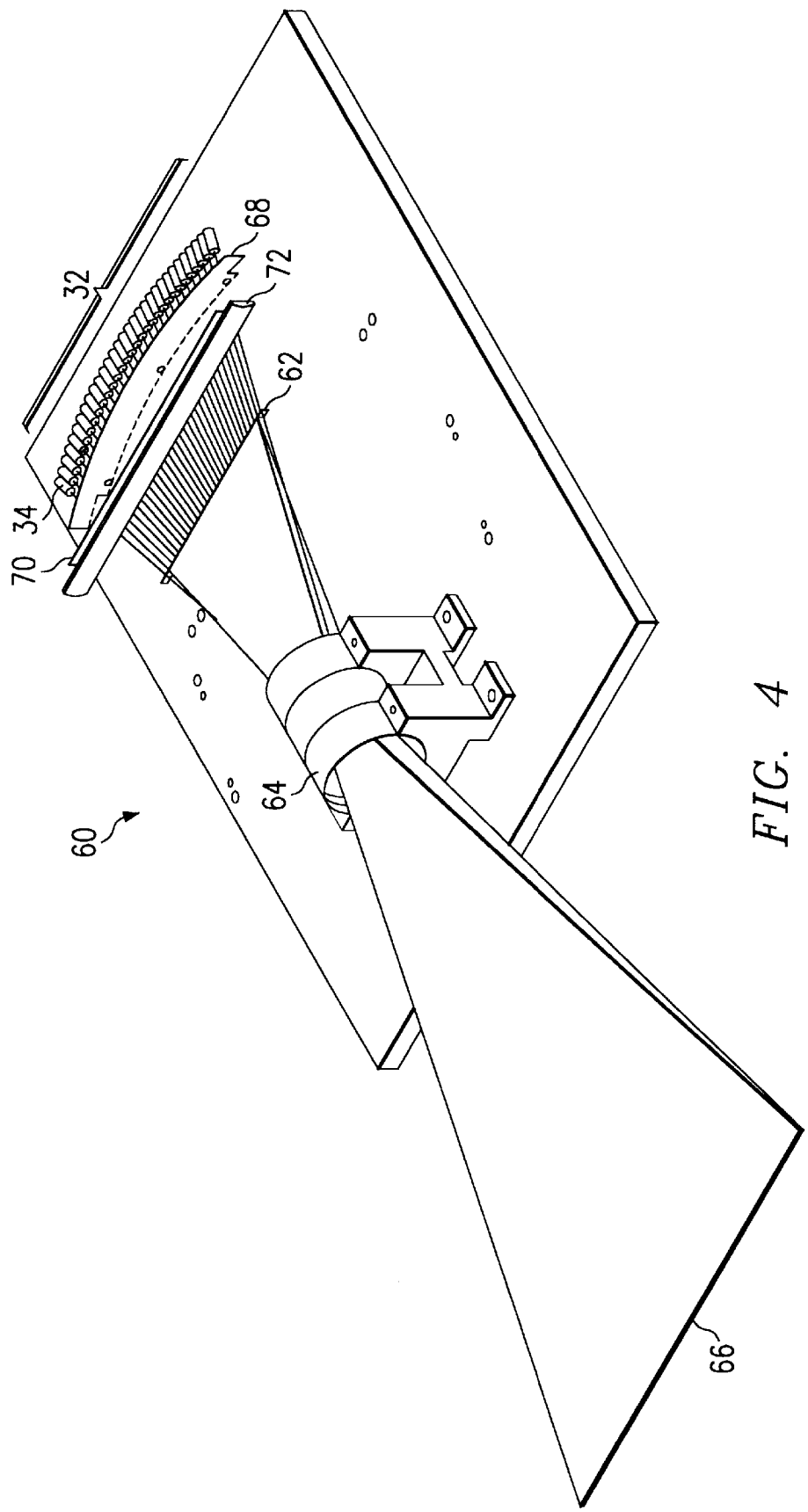
FIG. 4 is a perspective view of an alternative preferred embodiment of the present invention whereby the spatial light modulator may be of the transmissive type, such as a liquid crystal display.

Referring now to FIG. 4, there is generally shown at 60 an alternative preferred embodiment of the present invention to that shown in FIG. 2 and FIG. 3, whereby a spatial light modulator 62 of the transmissive-type, such as a liquid crystal display, is utilized in place of the reflective-type DMD spatial light modulator 40. In this embodiment, the curved array 32 of light emitting elements 34 is positioned on the far side of the transmissive spatial light modulator 62, as shown. The light from the array 32 of light emitting elements 34 is converged onto the spatial light modulator 62, with the transmitted modulated light then being directed into a projection lens 64. The light image is focused by projection lens 64 to image plane 66. A holographic diffuser 68 and 70 are utilized to diffuse the light from the array 32 in the cross-process direction, with a cylindrical lens 72 compressing the light from array 32 in the process direction as previously described.

Figure 5:
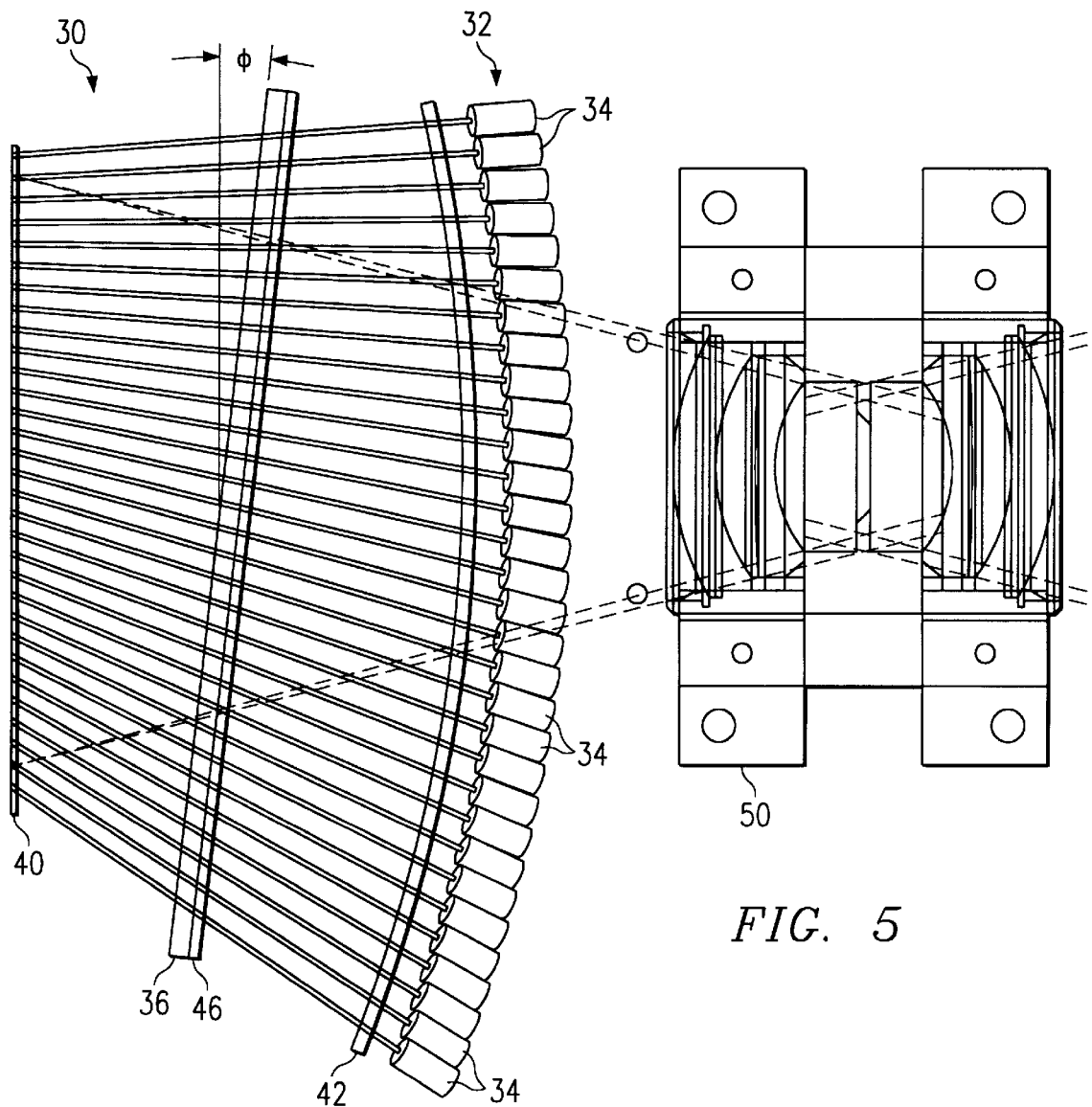
FIG. 5 is an optical schematic diagram illustrating the paths of the light from the individual light emitting elements, when viewed from below the apparatus of FIG. 2, illustrating the curvature of the light emitting element array, as well as how the cylindrical lens is skewed with respect to the spatial light modulator.

Referring now to FIG. 5, there is shown an optical schematic diagram of the embodiment shown in FIG. 2 and 3 illustrating the orientation of each of the light emitting elements 34, and the light path of the light from each element 34. As illustrated, the light from each element 34 is directed through the first holographic diffuser 42 which extends parallel to the array 32, through the second holographic diffuser 46 and the cylindrical lens 36, and converges upon the DMD spatial light modulator 40. Spatial light modulator 40 modulates the mixed elongated beam of light, with the modulated light image being directed into the projection lens 50. As shown, cylindrical lens 36 is skewed angle Theta ($\theta$), from that of a line parallel to spatial light modulator 40, as shown. This orientation of cylindrical lens 36 effectively directs the light from the curved array 32 to uniformly illuminate, or custom illuminate if desired, spatial light modulator 40. The curvature of array 32 is chosen such that the combined 6 cams from all array emitters are focussed into one central concentration of energy at the pupil at the projection lens. This technique is commonly know as "Koehler" Illumination. The vertical, or "process direction" beams, however, are focussed by the cylindrical lens 36 at the plane of the spatial light modulator. This type of illumination technique is commonly known as "Abbe", or critical illumination.

Individual DMD mirrors pivot +1–10 degrees from their neutral state on an axis that is rotated 45 degrees. Because of the long aspect ratio of the DMD device, the angles of each diode are such that energy of each diode is directed off the respective mirrors of the DMD array and into the entrance pupil of the projection lens 50. The goal is to direct the maximum amount of energy from each LED diode 34 to the image plane 52 of the system. In the preferred embodiment of the invention using a 4.7 inch long DMD mirror array and a F5.6 projection lens, the die of each LED 34 is oriented to be approximately 139.43 mm from the DMD active area plane. The distance from the DMD active plane to the entrance pupil of the F5.6 lens is approximately 185.403 mm, and thus the arc of the LED die array has a radius of 324.833 mm. That is, the dies of the LEDs lie on an arc having a radius of 324.33 mm. In the preferred embodiment of the present invention, thirty two (32) diodes are used to ensure that illumination roll-off is compensated when the illumination optics are positioned at the compound angle. However, limitation to these specific dimensions, the number or type of illumination elements is not to be inferred.

A unique feature of the curve chosen is that the curve provides an optimum reflective efficiency for reflective SLM's, i.e, reflected light from each mirror pixel is not the same across the length, or cross-process direction. This effect is caused by a "fore shortening" effect as a result of tilted reflection at different radial angles to the projection lens. Varied array angles can therefore be produced which can be optimized for different types of SLM's, both reflective and transmissive.

Another feature of the present invention is that the intensity of the LEDs 34 are individually set to shape the uniformity of the light beam therefrom at whatever plane is important, which is at the image plane 52 in the present invention. Thus, while the spatial light modulator 40 can be uniformly illuminated from one end to the other end, the output of each LED is ideally individually chosen to compensate for optical variants such as $\cos^4\theta$ effects of the relay optical system including the projection lens 50, as well as $\cos\theta$ effects of the DMD deflection if a DMD is utilized. Again, transmissive spatial light modulators, such as LCD displays, or other spatial light modulators may be used, and thus the flexibility of adjusting the light output of each LCD 34 is to be appreciated.

Figure 6:
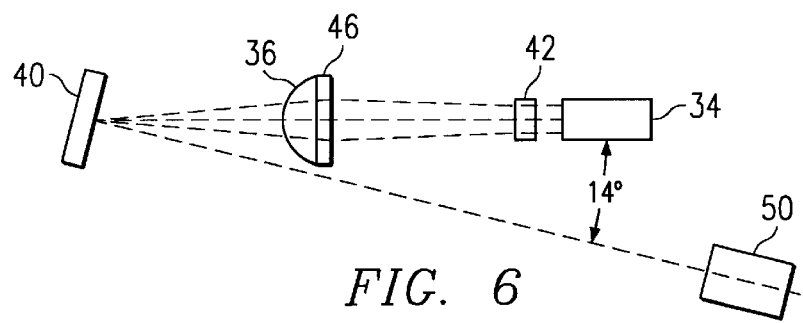
FIG. 6 is a side view of the optical diagram of FIG. 5, illustrating the light of each light emitting element being compressed in the vertical direction by the cylindrical lens onto the spatial light modulator, and directed downwardly by the spatial light modulator to the projection lens.

FIG. 6 is an optical schematic diagram taken from the side of system 30, illustrating the light path from each of the light emitting elements 32 onto spatial light modulator 40. As shown, cylindrical lens 36 compresses the light in the vertical or process direction onto the spatial light modulator 40. Spatial light modulator 40 directs the imaged light into the projection lens 50, downwardly and back under the cylindrical lens 36.

Figure 7:
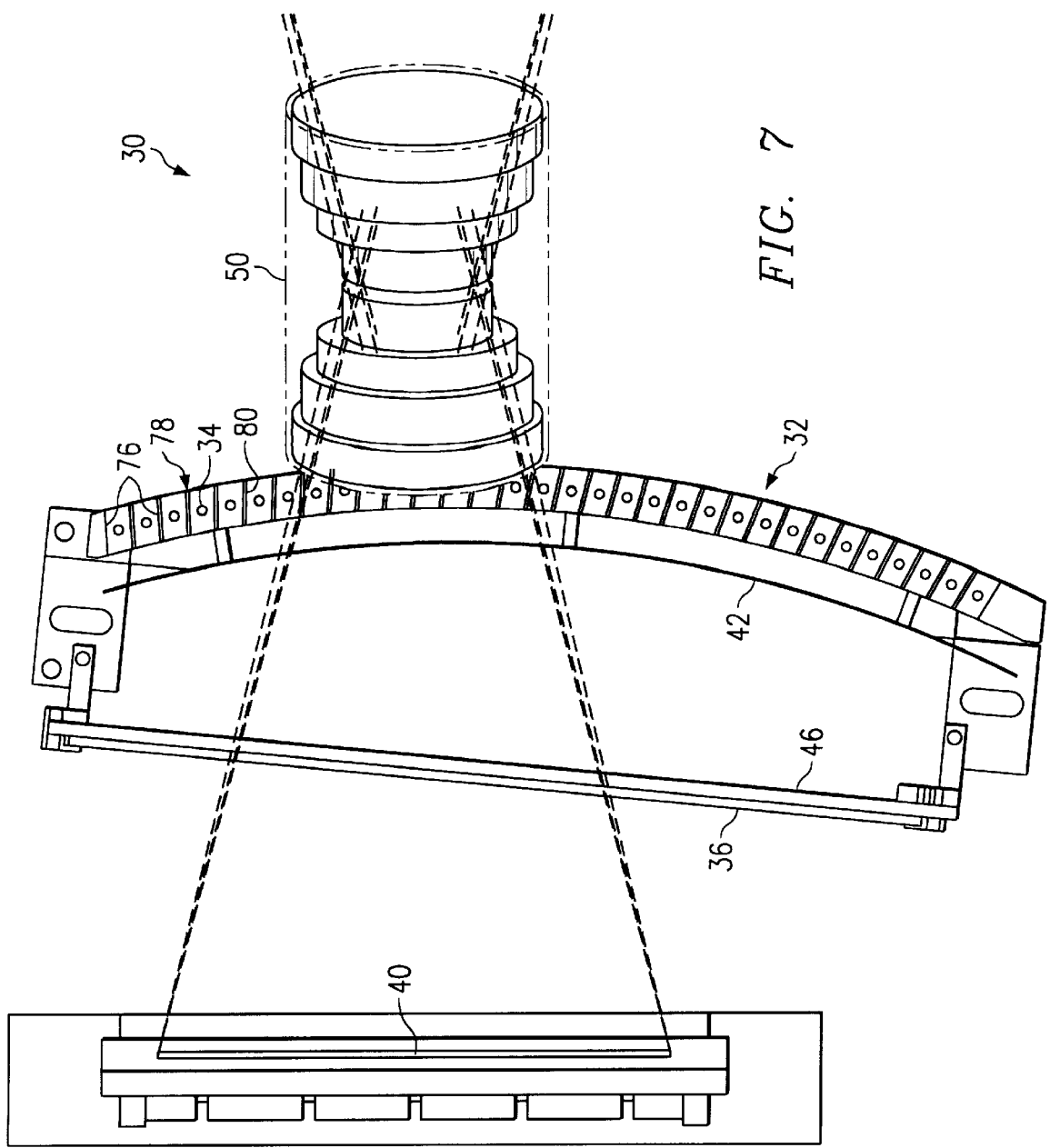
FIG. 7 is a view taken from the bottom of the apparatus of FIG. 2 illustrating the orientation of the two holographic diffusers and the cylindrical lens, with respect to the array of light emitting elements and the spatial light modulator, and also illustrates the housing openings holding the LEDs.

FIG. 7 is a mechanical drawing taken from below illumination system 30, illustrating a series of cylindrical openings 76 opening through a curved housing 78 and housing each of the light emitting elements 34. Preferably, each LED 34 is positioned and aligned within a light-reflective tube or cavity 80 such that the light output of each LED 34 is directed along the central axis of the tube 80. One tube 80, along with LED 34, is secured within each one of the cylindrical openings 76 using adhesive or the like. The need to secure the LED within a reflective tubing or cavity 80 is to insure the light output from the LED is precisely directed along the central axis thereof, which may not be the case in some LED devices. If the light output from each LED 34 is precisely along the central axis of the device the need for alignment of device 34 within the tube 80 prior to insertion within housing 78 is not necessary.

A technical advantage of the present invention is the elongated distribution of uniform intensity light to elongated spatial light modulator 40. It is been found that over an extended period of time one or more LEDs 34 will experience a degradation in light output of as much as 10%. Typically, this degradation has been observed after 1,000 hours of operation in some devices. The present invention thoroughly mixes the light output from the individual LEDs in the cross-process direction so as to reduce the localized degradation in light intensity at spatial light modulator 40 due to the reduced output of one or more LEDs. The present invention, with a 10% reduction in light output of one LED 34, only produces less than 1% reduction in light intensity at any localized area of elongated spatial light modulator 40. For a 20% reduction in light intensity of any LED 34, a maximum 3% reduction in light is observed at any location along spatial light modulator 40. With a worst case 30% reduction in any LED output, only a 6% reduction in intensity is observed at any localized area along elongated spatial light modulator 40. Hence, through use of the elongated array of light emitting elements, in combination with the spreading elements, which preferably comprise holographic diffusers, light is effectively mixed and homogenized in the cross-process direction to reduce localized light reduction at spatial light modulator 40. The curved array of light emitting elements generates a sufficient light output and can be placed closely proximate the spatial light modulator 40 as shown. Preferably, thirty-two (32) light emitting elements 34 are utilized, each LED having a light output of 0.5 milliwatts. The length of array 32 is typically about 200 millimeters, with the length of spatial light modulator 40 being about 120 millimeters.

Figure 8:
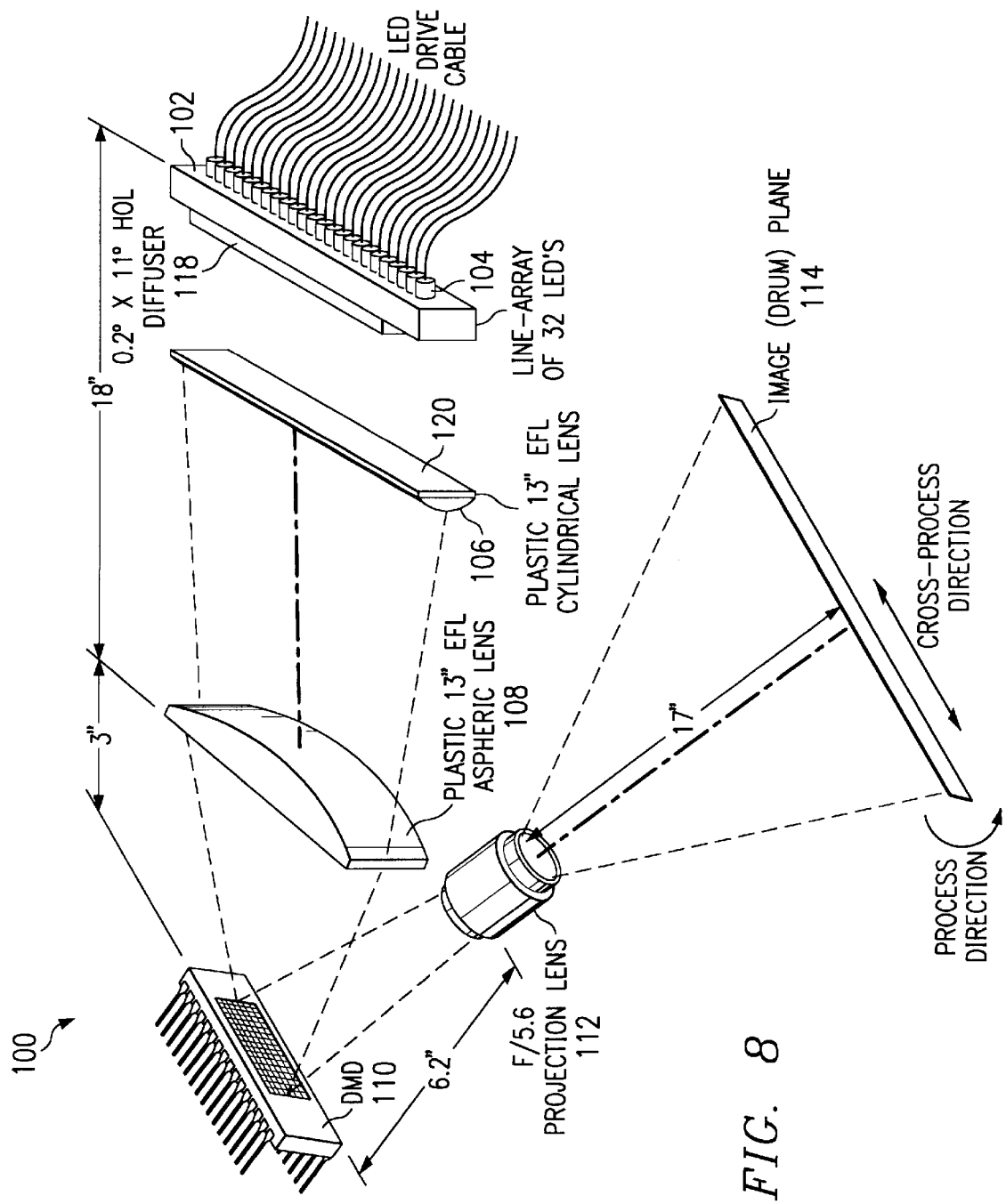
FIG. 8 is a perspective view of an alternative preferred embodiment of the present invention whereby a linear coplaner elongated array of light emitting elements is utilized in combination with an aspheric lens to compress/converge the light from the array in the cross-process direction onto the elongated spatial light modulator, with a cylindrical lens utilized to compress the light in the vertical or process direction.

Turning now to FIG. 8, there is shown an alternative preferred embodiment of the present invention at 100.

Illumination system 100 is similar to that of system 30 shown in FIG. 2, whereby a coplanar linear array 102 of light emitting elements 104 is utilized. A cylindrical lens 106 compresses the elongated beam of light from array 102 in the vertical or process direction, and directs the compressed light into an aspheric lens 108 as shown. A toroidal aspheric lens 108 compresses the light in the cross-process direction, and also in the process direction, and illuminates an elongated spatial light modulator 110, which is preferably comprised of a DMD such as that previously described in the cross-referenced commonly assigned patents and patent applications, the teachings being incorporated herein by reference. Spatial light modulator 110 modulates the incident light, and directs the modulated light image into a projection lens 112, which may be F/5.6 projection lens, although other lenses may be utilized as well. Projection lens 112 focuses the modulated light image onto an image plane 114 which may be an OPC exposure module, such as drum 24 shown in FIG. 1. An elongated holographic diffuser 118 is positioned in front of LED array 102 to diffuse the light from each of the LEDs 104 in the cross-process or lateral direction, such as previously described with regards to the embodiment shown in FIG. 2. Diffuser 118 diffuses the light 0.2 degrees in the process direction, and 11 degrees or more in the cross-process direction. A second holographic diffuser 120 is positioned on the front of cylindrical lens 106 and further diffuses the light in the cross-process direction to insure a through mixing of the light output from the individual LEDs 104. Illumination system 100 utilizes an aspheric lens 108 to compress/converge the elongated beam of diffused light onto the spatial light modulator 110, similar to using a curved array 32 of LEDs 34 as shown in FIG. 2. Hence, the present invention encompasses utilizing an elongated array of light emitting elements which may or may not be curved, with the light output from the light emitting array being mixed in the lateral direction, preferably by a holographic diffuser, to achieve thorough mixing before illuminating a spatial light modulator. Again, while a DMD spatial light modulator is preferable and shown in the preferred embodiment of the present invention, other spatial light modulators of the transmissive-type, including liquid crystal displays, call be utilized in place of the DMD, and limitation to any specific type of spatial light modulators is not to be inferred. Rather, the present invention is suited for illuminating an elongated, and possibly an irregularly shaped, spatial light modulator, such as a 4.7 inch long DMD utilized in the present invention to modulate incident light and form a light image for exposing an image plane.

Referring to FIG. 9, an optical schematic diagram of illumination system 100 is shown to illustrate the path of light from each light emitting element 104. As shown, aspheric lenses 118 and 108 image the emitters of light emitting elements 104 into the pupil of the projection lens 112 in the cross-process dimension. Cylindrical lenses 106 and 114 image the emitters of emitting elements 104 onto the DMD 110 in the process dimension. Specific designs may have the image of 104 only near the pupil of 112 rather than in the pupil in the cross-process dimension, and the image of 104 near the DMD rather than on the DMD in the process dimension. The lens 108 converges and directs the light from each of the LEDs 104 on spatial light modulator 110. The light image from spatial light modulator 110 is directed into projection lens 112. Referring to FIG. 10, it can be seen that cylindrical lens 106 and 114 compresses the light in the vertical or process direction onto the spatial light modulator 110. A spreading element such as a holographic diffuser can be placed near the sources 104 and near the lens 108 to achieve mixing of the light sources if needed.

Referring to FIG. 11, there is shown a diagram of a single-row LED array which may be utilized for array 32 and 102. This array generates a thin linear beam of light suitable for uniformly illuminating the spatial light modulator. Referring to FIG. 12, the LED array may be comprised of multiple rows of light emitting elements to generate a more intense beam of light. However, this elongated beam of light will have a greater thickness from that generated by the array shown in FIG. 11. The cylindrical lens sufficiently compresses the light beam from either array in the process direction and onto the spatial light modulator as required.

Referring to FIG. 13, there is shown an optical schematic diagram of yet another alternative preferred embodiment of the present invention at 130. The illumination system 130 is similar to that system 100 shown in FIG. 8, FIG. 9 and FIG. 10, in this embodiment, except the LEDs are mounted together in groups 132 of several emitters in a single device which is an array. The light source for the illuminator is composed of several of these arrays 132 as shown. The number of arrays used in the illuminator and the number of emitters per array are design parameters chosen for the specific application. Many emitters could be placed in one array and the illuminator could be driven by this single array. An additional cylindrical lens 134 is utilized.

Referring now to FIG. 15 and FIG. 16, there is shown yet another alternative preferred embodiment of the present invention as illumination system 150. In system 150, a linear array 152 of LEDs 154 directs light into a cylindrical lens 156 which collimates the light from the LEDs 154, as shown. An aspheric lens 158 converges the parallel beams of light and focuses the light at a holographic diffuser 160, as shown. The diffused light from diffuser 160 is thereafter converged by a pair of aspheric lenses 162 and 164 in the cross-process direction, and by a cylindrical lens 166 in the process direction onto a DMD spatial light modulator 168. The aspheric lens 162 and 164 may be Fresnel Aspheres to reduce thickness of the system if desired. The imaged light from DMD 168 is then directed into the pupil of a projection lens 170 as shown.

Although more complex than the illumination system 30 and 100 shown in the earlier Figures, illumination system 150 achieves technical advantages including even more diffusing of light at the focal point of lens 158.

Referring now to FIG. 17 and FIG. 18, there is shown yet another alternative preferred embodiment of the present invention as illumination system 180. The emitters 184 are placed in the focal plane of lenses 186 in the cross-process dimension. In the process dimension, lens 188 images the emitters onto the face of the integrating plate 190 as shown. The integrating plate mixes the beams from the emitters. The front of the plate is curved so that the light leaving the plate is directed to the pupil of the projection lens 192. Lens 194 images the aperture created in the process dimension by the pair of mirrors 196 onto the DMD 198. The light is then reflected from the DMD into the projection lens 192. FIG. 18 is a side view of the integrating plate 190 folded to conserve space and illustrate the mirrors which create the aperture in the process dimension.

Referring now to FIG. 19 and FIG. 20, there is shown yet another alternative preferred embodiment of the present invention as illumination system 200. This embodiment is a combination of the embodiments of FIGS. 15 and 17 wherein diffusion is achieved by both the glass plate integrator 202 and a spreading element or diffuser 204. the emitters 206 are placed in the focal plane of lens 208 and the light is directed into the integrator plate 202 in the cross-process dimension. Lens 210 images the emitter in the process dimension onto the face of the integrator. Mixing of the light from the emitters is provided by the integrator plate 202. the curve on the end of plate 202 directs the light onto the diffuser 204 in the cross-process dimension and lens 212 directs the light in the process dimension onto the diffuser 204. Lens 216 images the diffuser in the cross-process dimension into the aperture of the projection lens 218. Lens 220 images the aperture in the process dimension onto the DMD 222. Transparency 226 is provided to spatially selectively attenuate the light falling on the DMD so that the intensity is as uniform as possible.

The present invention, as illustrated and described in the various embodiments of the present invention, achieves technical advantages by uniformly illuminating an elongated spatial light modulator. An elongated array of light emitting elements is provided whereby the light output from each element is effectively mixed in the lateral or cross-process direction to achieve a thorough mixing before illuminating the spatial light modulator. Preferably, one or more holographic diffusers are utilized to thoroughly mix the light in the cross-process direction. The reduction in light output of one or more individual light emitting elements does not significantly reduce the light output at any localized portion of the spatial light modulator. The light elements may be LED's, lasers, flash lamps or other elements with a fast "on" response time. Either a linear or curved array of light emitting elements may be utilized whereby the light output from the array is converged on the spatial light modulator. A combination of aspheric and cylindrical lenses are utilized to direct the elongated beam of light onto the spatial light modulator. The imaged light from the spatial light modulator is focused by a projector lens to an image plane, such as an exposure module.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. An illumination system, comprising:
   (a) an elongated array of light emitting elements said array oriented lengthwise in a lateral direction, said elongated array of light emitting elements for emitting light along a light path;
   (b) a light mixing device on said light path, said light mixing device for receiving said light from said elongated element array and for mixing said light in said lateral direction; and
   (c) an elongated spatial light modulator on said light path, said elongated spatial light modulator positioned to be non-uniformly illuminated by said mixed light from a first end to an opposite end.

2. The system as specified in claim 1, further comprising a cylindrical lens positioned between said element array and said spatial light modulator.

3. The system as specified in claim 2 wherein said cylindrical lens lies in the same plane as said element array.

4. The system as specified in claim 2 wherein said cylindrical lens is parallel to said element array.

5. The illumination system as specified in claim 1 wherein said element array is arcuate.

6. The illumination system as specified in claim 1 wherein said element array is linear.

7. The illumination system as specified in claim 6 further comprising a lens converging said light from said element array and directing said converged light to said spatial light modulator.

8. The illumination system as specified in claim 7 wherein said lens comprises an aspheric lens.

9. The illumination system as specified in claim 7 wherein said lens comprises a fresnel lens.

10. The illumination system as specified in claim 1 wherein said light mixing device is a holographic diffuser.

11. The illumination system as specified in claim 10 further comprising at least one lens converging said diffused light onto said spatial light modulator.

12. The illumination system as specified in claim 11 wherein said lens comprise a cylindrical lens.

13. The illumination system as specified in claim 12 wherein said lens comprises a pair of cylindrical lenses.

14. The illumination system as specified in claim 1 wherein said light mixing device is a light integrator.

15. The illumination system as specified in claim 14 further comprising a diffuser diffusing said light from said light integrator.

16. The illumination system as specified in claim 1 further comprising a projection lens, said modulated light from said spatial light modulator being focused into said projection lens.

17. The illumination system as specified in claim 16 wherein said spatial light modulator directs said modulated light back under said incident mixed light.

18. The illumination system as specified in claim 16 further comprising an exposure module receiving said modulated light from said projection lens.

19. An illumination system, comprising:
   (a) an elongated array of light emitting elements said array oriented lengthwise in a lateral direction, said elongated array of light emitting elements for emitting light along a light path;
   (b) a light mixing device on said light path, said light mixing device for receiving said light from said elongated element array and for mixing said light in said lateral direction;
   (c) an elongated spatial light modulator on said light path to selectively transmit said mixed light to an image plane, wherein said mixed light non-uniformly illuminates said elongated spatial light modulator and said selectively transmitted light uniformly illuminates said image plane.

20. The illumination system of claims 19, wherein each element of said elongated array of light emitting elements outputs an amount of light, said output from each said element selected to non-uniformly illuminate said elongated spatial light modulator and uniformly illuminate said image plane.

21. The illumination system of claim 19, said illumination system further comprising a spatial attenuator on said light path.

* * * * *

UNITED STATES PATENT AND TRADEMARK OFFICE
CERTIFICATE OF CORRECTION

PATENT NO. : 5,954,424
DATED : September 21, 1999
INVENTOR(S) : Charles H. Anderson, John B. Allen, George Nado, Mike Harte, and Oscar Banos It is certified that error appears in the above-indentified patent and that said Letters Patent is hereby corrected as shown below:

Cover Page, insert Item [60] under Related U.S. Application Data

--Provisional Application No. 60/007,034 Oct. 25, 1995.--

Signed and Sealed this

Twentieth Day of March, 2001

Attest:

NICHOLAS P. GODICI

*Attesting Officer*    Acting Director of the United States Patent and Trademark Office